C. T. MASON.
APPARATUS FOR GENERATING ELECTRIC CURRENTS.
APPLICATION FILED JUNE 8, 1918.

1,416,110.

Patented May 16, 1922.
4 SHEETS—SHEET 2.

Witness
Albert Poplens

Inventor
Charles T. Mason
By H. R. Van Deusen
Attorney

C. T. MASON.
APPARATUS FOR GENERATING ELECTRIC CURRENTS.
APPLICATION FILED JUNE 8, 1918.
1,416,110.
Patented May 16, 1922.
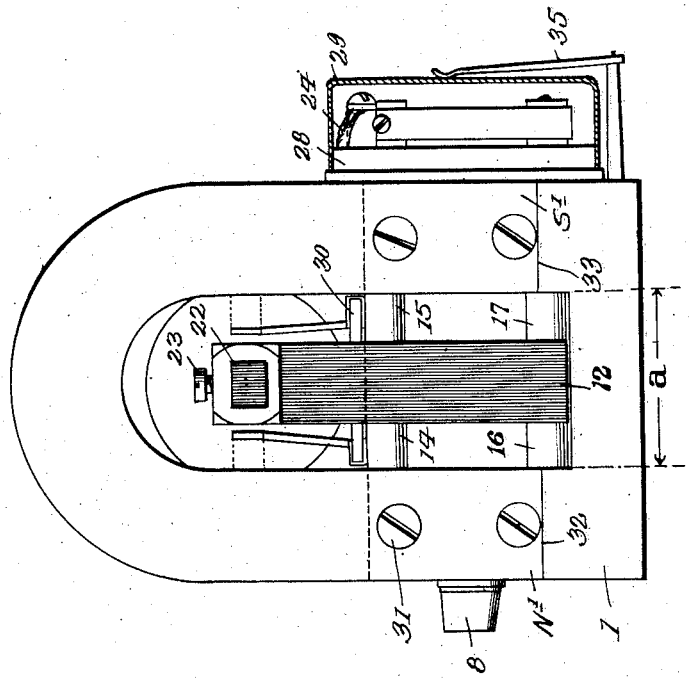
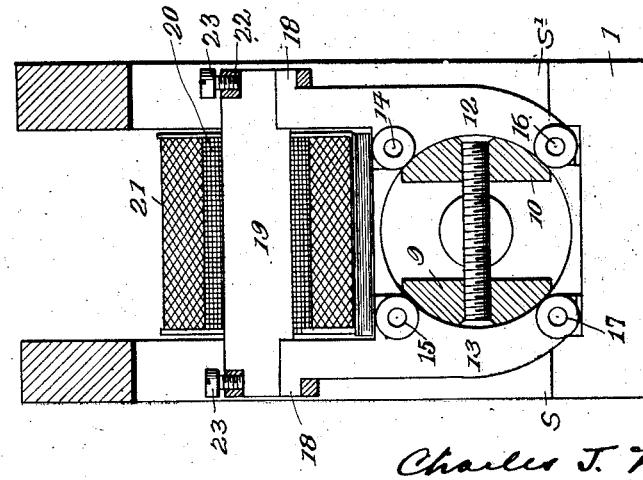

C. T. MASON.
APPARATUS FOR GENERATING ELECTRIC CURRENTS.
APPLICATION FILED JUNE 8, 1918.

1,416,110.

Patented May 16, 1922.
4 SHEETS—SHEET 4.

Witness
Albert Hopkins

Inventor
Charles T. Mason
By H. R. Van Deventer
Attorney

UNITED STATES PATENT OFFICE.

CHARLES THOMAS MASON, OF SUMTER, SOUTH CAROLINA, ASSIGNOR TO SPLITDORF ELECTRICAL COMPANY, OF NEWARK, NEW JERSEY, A CORPORATION OF NEW JERSEY.

APPARATUS FOR GENERATING ELECTRIC CURRENTS.

1,416,110.

Specification of Letters Patent. Patented May 16, 1922.

Application filed June 8, 1918. Serial No. 238,934.

*To all whom it may concern:*

Be it known that I, CHARLES THOMAS MASON, a citizen of the United States, residing at Sumter, in the county of Sumter and State of South Carolina, have invented certain new and useful Improvements in Apparatus for Generating Electric Currents, of which the following is a specification, reference being had to the accompanying drawing.

My invention relates to electric generators and particularly to generators used for igniting the charge in internal combustion engines. Such machines are commonly termed magnetos and while my invention is peculiarly applicable to such machines it will be understood that the method of contruction may be used in a dynamo for any purpose.

My invention consists more in the method of arranging the magnets and other parts in relation to each other than in the construction of the parts themselves; and numerous alternative arrangements will be obvious to those skilled in the art after the principle or method is disclosed. All such arrangements I deem within the scope of my invention.

My invention as applied to ignition dynamos embodies permanent magnets and a rotor having magnetic elements spaced apart and of permanent and opposite polarity. Each element may have one or more horns or prongs. The prior art, such for instance as my U. S. Patent Reissue 14,373 dated Oct. 2nd, 1917, discloses such a rotor arrangement, but the present invention constitutes an improvement over machines employing such rotors for the reasons hereinafter pointed out.

Some of the objects of my invention are to produce an ignition dynamo in which a maximum amount of flux from the permanent magnets is gathered and conducted into the rotor. A magneto in which the necessity for close machining in connection with the end fit of the rotor is eliminated. A magneto in which the several parts are simple and cheap to construct and easy of assembly, and a magneto in which the highest possible efficiency is obtained with a minimum weight magnet.

There are other objects hereinafter more fully described and claimed.

Figure 1:
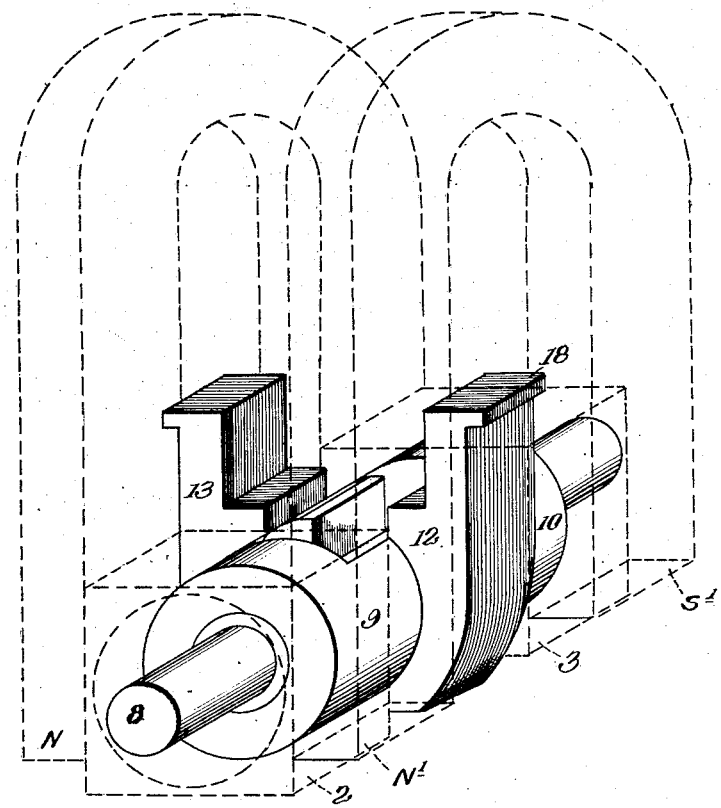
Figure 2:
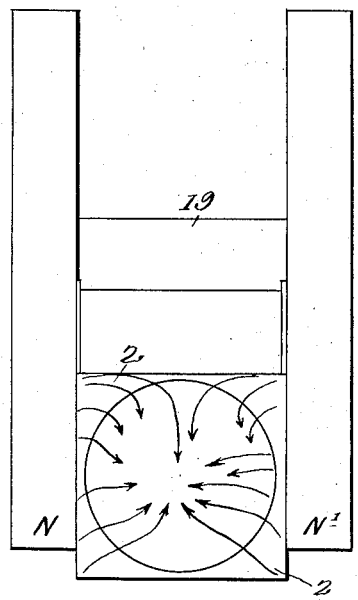
Figure 7:
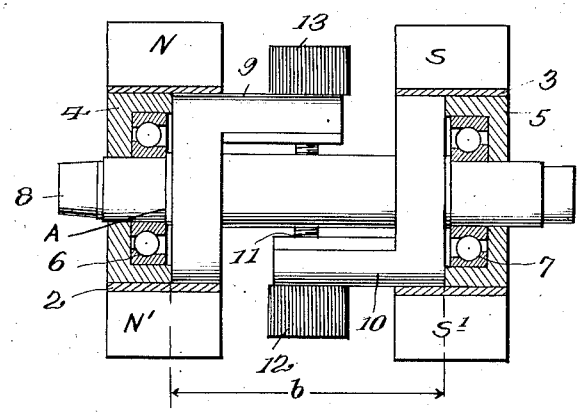
Figure 5:
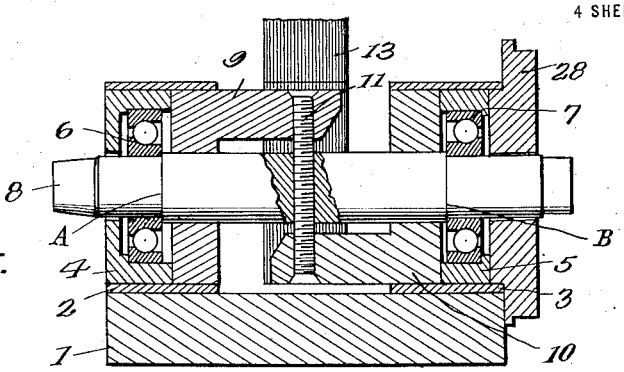
Figure 6:
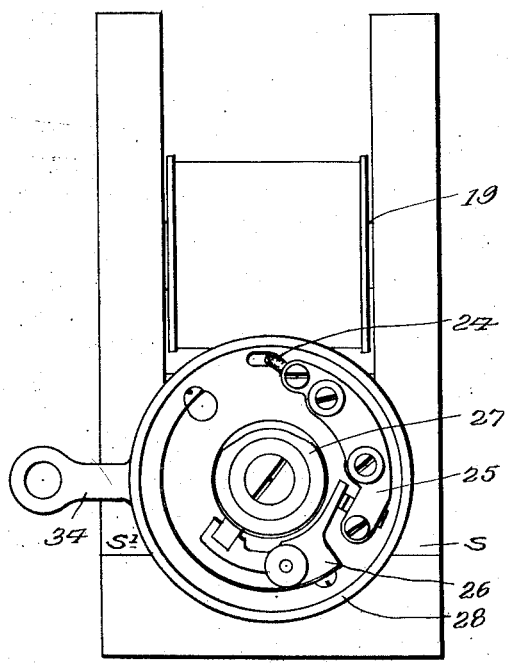

In the accompanying drawings in which like figures of reference denote the same parts wherever they are shown, Fig. 1 is a diagram showing the magnets, rotor and pole pieces arranged in accordance with my method. Fig. 2 a diagram illustrating the collection of flux lines by end blocks arranged between like poles of magnets arranged as shown in Fig. 1. Fig. 3, is a diagrammatic end view of a magneto with coil, constructed in acordance with Figs. 1 and 2. Fig. 4 is a side view of a complete magneto embodying my invention. Fig. 5, a section through the rotor and supporting structure therefor of the magneto shown in Fig. 4. Fig. 6 is an end view of the magneto, Fig. 4, with the breaker cap removed. Fig. 7 is a diagrammatic bottom view of the rotor, pole pieces and their supports in a magneto as shown in Fig. 4.

In my prior patent hereinbefore mentioned and in machines of the well known Dixie type, the rotor is mounted within and between the magnet poles which are usually provided with end plates, such for instance as shown in U. S. patent to me #1105361 dated July 28, 1914. In this and all similar structures of the prior art, like poles of the permanent magnets employed have of necessity been brought together, or in contact with end plates on their inner polar surfaces as shown in the said patent 1105361 or with their polar ends in contact with end blocks or members forming extensions thereto in which the rotor is mounted as shown in British Patent #14,737 of June 28, 1906.

It is well known that if a pair of magnets are brought together, like poles will repel and this repellant action occasions a loss in the total available magnetic flux when a pair of magnets are placed with their like poles together as shown in the hereinbefore mentioned patents or in any other arangement known in the prior art, in which end plates or blocks forming polar extensions not between like poles are employed.

I have discovered that by placing a pair of magnetic blocks at each end of the rotor, and separating the magnets, placing their poles in side contacts with the blocks instead of in end contact therewith, that the efficiency of the magneto is greatly increased and that many mechanical difficulties heretofore met with are eliminated. Those end blocks quite efficiently gather flux of similar polarity from the like poles of the magnets and conduct it centrally to the rotor. This flux is not available when the magnets are arranged in any other manner.

A clear distinction between the present invention and the prior art will be gained by a consideration of the fact that in the machines of the prior art the end plates adjacent the rotor either had the magnets standing on top of them or were made relatively thin and were laterally embraced by the magnets. The first arrangement, shown in the before-mentioned British patent is so inefficient as to have never come into extended use. The latter form of construction shown in my prior patents heretofore mentioned, is in extended use, and is quite practical, but to insure the necessary efficiency, especially in small magnetos, the air gap between the rotor and the end plates in contact with the magnet poles must be very close indeed, which requires very accurate machining and the accurate fitting of the bearings in which the rotor is supported. The present invention eliminates these difficulties.

I shall now describe an ignition dynamo of the high tension or jump spark type constructed in accordance with my method. It will be understood, however, that the machine is equally efficient for low tension ignition when properly designed and provided with a suitable winding.

The numeral 1 denotes a non-magnetic base to which is attached in any suitable manner the end blocks 2 and 3 bored out to receive plugs or bearing holders 4 and 5, supporting the ball bearings 6 and 7, the plugs being recessed to accommodate the bearings as shown.

In these bearings is supported the non-magnetic shaft 8 of the rotor comprising the magnetic elements 9 and 10 secured to said shaft in any suitable manner and having through their tips a non-magnetic threaded bolt 11. Preferably the shaft 8 is shouldered at A and B to make bearing seats for bearings 6 and 7. That part of the shaft between the bearing seats A and B I term the body portion. It will now be observed that the overall length of the rotor need not be accurate to a few thousandths of an inch as has heretofore been necessary, or if there is a slight variation in this length, it merely means that the plugs 4 and 5 are not pushed quite as far into the openings in 2 and 3; and yet owing to the fact that the fit between 4 and 2, and 5 and 3 is a pressed one, the magnetic continuity between the flux gathering end blocks 2 and 3 and the rotor horns 9 and 10 is preserved.

It is further evident that 4 and 5 may be pressed closely to 9 and 10 so that a very narrow air gap is easily obtained without the necessity of accurate machining.

The core structure in a magneto of this character consists of the laminated pole pieces 12 and 13, the opposed faces of which are adjacent the path of travel of the rotor horns 9 and 10. These pole pieces are supported by the non-magnetic bolts or pins 14, 15, 16 and 17 whose outer ends are secured to the blocks 2 and 3, whereby the pole pieces are accurately positioned in relation to the rotor.

By this construction I am enabled to take the base 1 carrying the end blocks 2 and 3 to which the pole pieces 12 and 13 have been assembled, and bore it out from end to end without the necessity of machining any shoulders for the bearings, and without changing the boring tools.

The upper end of pole pieces 12 and 13 is shaped as shown at 18, and supports the core 19 of the generating coil carrying the primary winding 20 and the secondary winding 21. By forming 18 as shown, I provide a very efficient joint of wide area between the pole pieces and the core, and instead of removing any of the material at this joint to provide a hole for the clamping screw as heretofore, I provide a clamp 22 and clamp screw 23 at each end of the coil as shown. This arrangement provides a maximum path for flux through the core 19, and permits of the ready removal and replacement of the coil. The coil is provided with suitable terminals for the generating windings and one of these terminals is usually connected to the framework of the machine while the other designated by the numeral 24 may be connected to the fixed insulated contact 25 of the breaker or interrupter, adapted to be engaged by the moving contact 26 operated from the cam 27 mounted on the rotor shaft. This breaks the primary circuit at the proper time, thereby causing the generating winding to operate in the well known manner. The timing may be altered by moving the lever 34 thereby moving the breaker mechanism in relation to the cam. The breaker mechanism is held in position by spring 35.

It will be observed that the interrupter mechanism is mounted upon a plate 28 which fits into the aperture in end block 3 and that a cap 29 encloses the interrupter mechanism. A suitable condenser for the primary circuit may be placed under the coil as shown at 30 and connected thereto in any suitable manner.

It will now be observed that if I attempted to place the magnets on this rotor and coil structure in any of the positions shown in the prior art, I would either produce an inefficient magneto or one in which none of the known difficulties are eliminated. For instance if I set the magnets with their polar tips on top of the end blocks 2 and 3, practically all of the flux from the stronger magnet of the pair would flow into the weaker magnet, thus necessitating careful pairing of the magnets and reliance upon their aging uniformly. A further objection is that polar tips N—N¹ and S—S¹ would not extend down far enough towards the center line of the rotor, which I have found is necessary to insure efficiency, as it appears impossible to form an extension below the magnet poles to provide a good path for flux into the rotor.

If the magnets are placed on the structure so as to embrace the end blocks 2 and 3 laterally, then the magnets must be cut out for the rotor shaft; furthermore the dimension $b$ Fig. 7, must be very accurately machined and as the rotor and field structure is comprised of several parts it is difficult and expensive to machine and assemble them and secure this accuracy. Furthermore the interior lateral faces of the magnets must be accurately ground and considerable difficulty is experienced in securing these magnets to the end plates, for in any of the arrangements heretofore known, the end plates have been very thin so as to bring the magnet poles as close to the rotor as possible.

I eliminate all of the foregoing difficulties by mounting the magnets as shown in the diagram, Fig. 1. The magnets are bent flat and a single magnet does not serve as effectually as two. The inner faces of the magnets are struck off on a disc grinder, and if in hardening the magnets warp so that the ends of the same are spaced more or less apart, they are not rendered worthless as is the case when applied endwise about the rotor shaft and over the end plates. The magnets are readily attached to the end blocks by means of screws, one of which is indicated at 31. If the lower ends indicated by the numerals 32 and 33 of the magnets are not quite the same length, it will make no difference in the operation or efficiency of the machine.

In placing the magnets against the end blocks, I find that the lower end of the magnets should occupy about the position shown in Fig. 2. If the ends of the magnets are pushed much below this point or raised much above it, the efficiency of the machine will be lowered.

As the poles of each magnet may be brought nearer together by this method, the distance $d$ Fig. 4 may be reduced to a minimum and the poles of each magnet lie at the side of the rotor whose axis is parallel with the poles of each magnet. The total flux from both magnets is, by this arrangement, made available at the rotor.

If $A$=total available flux from one magnet and $a$=amount of flux lost due to repellant action of like poles when two magnets are placed with like poles together, then in the arrangements in the prior art the total available flux at the rotor (disregarding such factors as air gap, etc.) is $2A - a$; but with my arrangement it is $2A$ minus $a'$; where $a'$ is perhaps a very small loss due to repellant action. This is experimentally demonstratable by measuring each magnet separately, then placing them together without any gap between like poles, then placing blocks 2, 3, in position and measuring the available flux. Instead of the apertured block 2, Fig. 2, repelling pole N¹ when already in contact with pole N, it actually attracts, and conducts the flux otherwise lost from N and N¹ into the rotor as shown by the arrows.

In assembling the magneto as just described, the structure comprising the base, end blocks and pole pieces is completed by having the rotor structure placed within it, ball bearing 6 and bearing holder 4 being pressed into block 2 and bearing 7 in holder 5 is then pressed into position, and it will be seen that by pressing on the bearing holders 4 and 5, any slight variation in the length of the rotor may be compensated for.

Breaker plate 28 is now assembled and the coil and condenser are placed in position. Finally the magnets are attached to the side of the end blocks, and if desired, the machine may have a suitable cover, not shown in the drawings.

As the operation of a machine of this character is already well known, I will not describe the same.

Having thus described my invention, I claim:

1. In a system for generating electric ignition current including a core carrying generating windings, means for furnishing a plurality of sources of constant magnetomotive force, having like poles associated and spaced apart, means for gathering the flux from the like poles consisting of megnetizable members disposed wholly between the like poles and further means for establishing and interrupting the flow of said gathered flux through said core and windings.

2. A magneto generator including in combination, a plurality of permanent magnets having like poles associated with each other but spaced apart, magnetizable members interposed between said like poles for gathering the flux from the positive poles for direction to the negative poles, generating windings, and means for directing an interrupted flow of the gathered flux through said windings.

3. A magneto generator including in combination, a plurality of permanent magnets having their like poles associated with each other but spaced apart, magnetizable members interposed between said like poles for gathering the flux from the positive poles for direction to the negative poles, a rotor constructed and located so as to receive gathered flux from said members, and generating windings and a core associated with the rotor, said rotor having means for reversing the flow of gathered flux through the core and windings.

4. In a magneto, a base, a pair of apertured blocks supported thereby, a pair of pole pieces spaced apart and supported on opposite sides of said blocks, a rotor adapted to conduct flux from the blocks to the pole pieces, and means carried by said blocks for supporting the rotor.

5. In a magneto, a base, a pair of apertured blocks supported thereby, a pair of pole pieces spaced apart non-magnetic rivets passing through said pole pieces and embedded in said blocks, a rotor having a shaft and magnetizable portions in said apertured blocks adapted to receive flux from said blocks regardless of the position of said rotor and laterally adjustable bearings for the rotor carried by said blocks.

6. In a magneto, a base, a pair of apertured blocks supported thereby, a pair of pole pieces spaced apart and supported by said blocks, a rotor having a shaft and magnetizable portions thereon supported in said apertures, and a pair of magnets secured to the sides of said blocks parallel to the shaft, the blocks being between like poles of the magnets.

7. In a magneto, a base, a pair of apertured members secured thereto, a pair of pole pieces, means whereby said pole pieces are spaced apart from said members but supported thereby, a rotor and shaft therefor and a pair of magnets secured to the sides of said blocks and having their polar extremities below the axis of said shaft.

8. In a magneto, a base, a pair of apertured blocks secured thereto, a pair of magnets secured to and extending along the side of the flat sides of said blocks, and a rotor having a shaft projecting from the apertures in said blocks and in a line parallel to the flat sides of said blocks and in the plane of the magnets.

9. In a magneto, the combination with a framework comprising; a base, two apertured blocks supported thereon and a coil structure comprising a pair of pole pieces carrying a core with windings thereon, of a pair of flat U-shaped magnets having the flat exterior sides of their polar extremities in lateral contact with said blocks, and a rotor comprising magnetic members and a shaft having its shaft supported in said blocks and the cylindrical path of rotation of the magnetic members wholly outside of and between said magnets but in co-operation with said pole pieces.

10. In a magneto, a rotor comprising a non-magnetic shaft having magnetizable members secured thereto, said members having overhanging portions substantially parallel to and spaced from the shaft and a non-magnetic pin passing through said shaft and overhanging portions of said members, whereby the same are rigidly secured in position.

11. In a magneto, a rotor comprising a non-magnetic shaft having magnetizable members secured thereto, said members having overhanging portions substantially parallel to and spaced from the shaft and a non-magnetic threaded pin passing through said shaft and overhanging portions of said members, whereby the same are rigidly secured in position.

12. In a magneto, a rotor shaft, magnetic members secured thereto, said members having heads of uniform diameter, said heads extending along said shaft and being secured thereto and having portions forming polar extensions, and a non-magnetic pin through said shaft and extensions, substantially as described.

13. In a magneto, a rotor shaft having a body portion, bearing seats at each end of the body portion, magnetizable elements secured to the body portion, ball bearings laterally adjustable on said bearings seats, and laterally adjustable means for supporting said ball bearings.

14. In a magneto, a base, a pair of spaced apart apertured blocks supported thereby, bearings in said blocks, a rotor supported in said bearings and a pair of magnets having flat exterior faces with said flat faces positioned against the faces of said blocks parallel with the rotor shaft, said bearings being laterally adjustable within the blocks, for the purpose set forth.

In testimony whereof I hereunto affix my signature.

CHARLES THOMAS MASON.